United States Patent [19]
Yamamoto

[11] Patent Number: 5,338,996
[45] Date of Patent: Aug. 16, 1994

[54] ARMATURE CORE

[75] Inventor: Kyohei Yamamoto, Himeji, Japan

[73] Assignee: Mitsubishi Denki Kabushiki Kaisha, Tokyo, Japan

[21] Appl. No.: 77,092

[22] Filed: Jun. 16, 1993

[30] Foreign Application Priority Data

Jun. 25, 1992 [JP] Japan .................. 4-192890

[51] Int. Cl.⁵ .................................. H02K 1/06
[52] U.S. Cl. ........................ 310/217; 310/42; 310/216; 310/261; 336/234
[58] Field of Search ............. 310/216, 217, 261, 42, 310/263, 91, 58, 59, 65; 29/598; 336/234

[56] References Cited

U.S. PATENT DOCUMENTS

| 3,202,851 | 8/1965 | Zimmerle | 310/217 X |
| 3,780,428 | 12/1973 | Zorev | 310/216 |
| 4,364,169 | 12/1982 | Kawano | 310/216 |
| 4,514,654 | 4/1985 | Muller | 310/216 |
| 4,538,345 | 9/1985 | Diederichs | 29/596 |
| 4,876,473 | 10/1989 | Tanaka et al. | |
| 5,075,150 | 12/1991 | Webb | 310/217 |
| 5,142,178 | 8/1992 | Kloster | 310/217 |

FOREIGN PATENT DOCUMENTS 2238755 2/1974 Fed. Rep. of Germany ...... 310/217

Primary Examiner—R. Skudy
Attorney, Agent, or Firm—Sughrue, Mion, Zinn, Macpeak & Seas

[57] ABSTRACT

An armature comprising a number of core sheets each having a number of slots and wherein a plurality of punched-in recesses for fitting are formed on the tail side of each core sheet and a plurality of punched-out protrusions for fitting provided by punching in said plurality of recesses are formed on the top side thereof, both by press-working; the core sheets being laminated by pressing the number of core sheets whereby said plurality of protrusions for fitting on the top side of each core sheet press-fit to said plurality of recesses for fitting on the tail side of a contiguous core sheet thereby positioning and integrally laminating the number of core sheets; wherein a plurality of protrusions for clearance each having a very small height are formed on the top side of each core sheet thereby providing a very small clearance between two of the contiguous core sheets.

3 Claims, 3 Drawing Sheets

ARMATURE CORE

BACKGROUND OF THE INVENTION

1. Field of the Invention

This invention relates to an armature core which is laminated with punched-off core sheets.

2. Discussion of Background

FIG. 5 is a sectional diagram showing an armature of a comparatively small-sized direct current machine for a vehicle and the like, provided with a conventional armature core. A reference numeral 1 designates an armature which is constructed as follows. A numeral 2 designates a rotating shaft, and 3, an armature core which is fixed to the rotating shaft 2, laminated with a number of core sheets 4 punched off from a steel sheet such as cold-rolled steel sheet or silicon steel sheet, on which surfaces no insulating treatment is performed. A numeral 5 designates an armature coil installed to the armature core 3, and 6, a commutator fixed to the rotating shaft 2, wherein the armature coil 5 is connected to a connecting portion 6b of a commutator bar 6a.

FIG. 6A is a front diagram of a conventional armature core, and 6B, a sectional diagram thereof. The core sheet 4 of the armature core 3 is formed with slots 7, an opening for shaft 8 and punched-out protrusions 9, on its top surface, which is formed by punched-in recesses 9a on the bottom surfaces of the core sheet, both by press-working. As shown in FIG. 6B, the press-worked core sheets 4 are continuously and successively laminated, and the protrusions 9 on the top surface of the core sheet 4 fit in the recesses 9a of the contiguous core sheet 4 on the bottom surface by pressing, thereby integrally laminating the core sheets. In this way, the core sheets 4 which have been punched off by the press-working step, construct the integrated armature core 3 by a succeeding laminating means. It is not necessary to laminate the core sheets after rearranging the respective punched-off core sheets 4. The laminated sheets are not disintegrated in the later steps.

In the conventional armature sheets 3, the respective core sheets 4 are laminated without clearance by fitting the protrusions 9 of the core sheet on the top surface into the recesses 9a of the contiguous core sheet on the bottom surface by pressing. Therefore, the respective core sheets 4 contact each other on the outer diameter face of the armature core 3, whereby the iron loss by eddy current is considerable, which lowers the output thereof.

SUMMARY OF THE INVENTION

It is an object of the present invention to solve the above problem and to provide an armature core which provides very small clearances among core sheets of the armature core, thereby reducing the iron loss and increasing the output.

According to a first aspect of the present invention, there is provided an armature comprising:

a number of core sheets each having a number of slots and wherein a plurality of punched-in recesses for fitting are formed on the bottom surface of each core sheet and a plurality of punched-out protrusions are provided when the recesses are formed on the top surface of each core sheet, both by press-working;

said number of core sheets being laminated by pressing the number of core sheets whereby said plurality of protrusions on the top surface of each core sheet press-fit into the plurality of recesses on the bottom surface of a contiguous core sheet thereby positioning and integrally laminating the number of core sheets;

wherein a plurality of clearance protrusions each having a very small height are formed on the top surface of each core sheet thereby providing a very small clearance between two of the contiguous core sheets.

According to a second aspect of the present invention, there is provided an armature comprising:

a number of core sheets each having a number of slots and wherein a plurality of punched-in recesses for fitting are formed on the bottom surface of each core sheet and a plurality of punched-out protrusions are provided when the recesses are formed on the top surface of each core sheet, both by press-working;

said number of core sheets being laminated by pressing the number of core sheets whereby said plurality of protrusions on the top surface of each core sheet press-fit into the plurality of recesses on the bottom surface of a contiguous core sheet thereby positioning and integrally laminating the number of core sheets;

wherein the plurality of protrusions and the plurality of recesses of each core sheet are formed such that in press-fitting the plurality of protrusions of a first core sheet to the plurality of recesses of a second core sheet contiguous to the first core sheet in laminating the number of core sheets the plurality of protrusions do not completely fit to the plurality of recesses to thereby provide a very small clearance between the first and the second contiguous core sheets.

According to the first aspect of the present invention, when the respective punched-off core sheets are laminated by pressing, the protrusions on the top surface of a core sheet are press-fitted into the recesses on the bottom surface of a contiguous core sheet to thereby position and integrally laminate the respective core sheets. Further, a very small clearance is provided between respective two contiguous core sheets by the clearance protrusions, thereby reducing the iron loss.

According to the second aspect of the present invention, when the protrusions on the top surface of each core sheet on the bottom side are press-fitted into the recesses on the bottom surface of a contiguous core sheet to thereby position and laminate the respective core sheets. Further, the corresponding protrusions and the recesses do not completely fit to each other, which provides a very small clearance between the respective two contiguous core sheets. In this way the iron loss is reduced.

DETAILED DESCRIPTION OF THE PREFERRED EMBODIMENTS

EXAMPLE 1

Figure 1A:
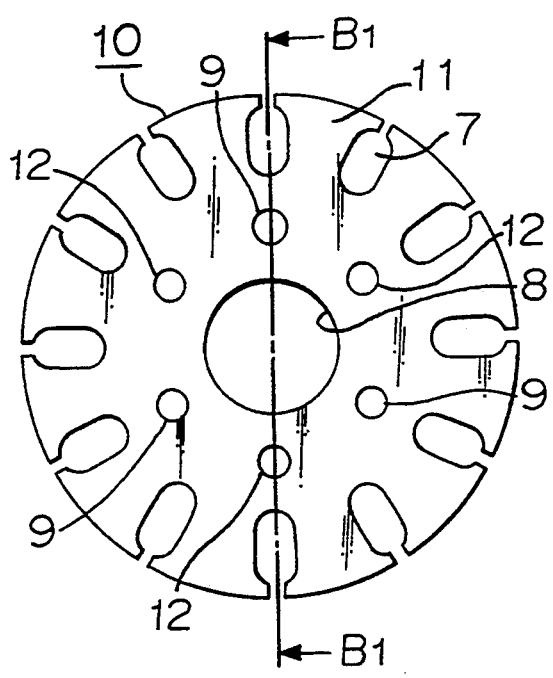
FIG. 1A is a front diagram of embodiment 1 of an armature core according to the present invention, and FIG. 1B, a sectional diagram taken along a line $B_1$-$B_1$ in FIG. 1A.
Figure 1B:
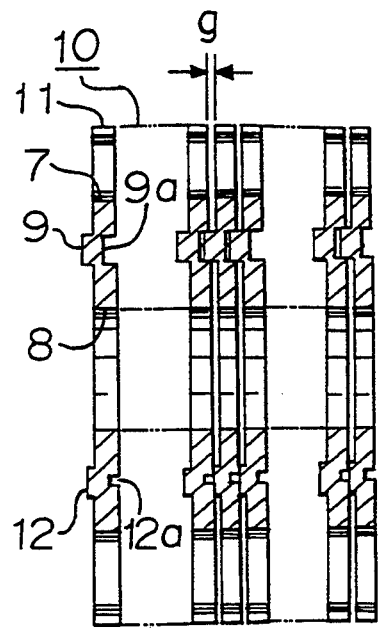

FIGS. 1A and 1B are respectively a front diagram and a sectional diagram showing embodiment 1 of an armature core of this invention. A core sheet 11 of an armature core 10 is formed with the slots 7, the opening for shaft 8, the plurality of punched-in recesses 9a on its bottom surface and the plurality of punched-out protrusions 9 on its top surface which are formed by punching the recesses 9a, both by press-working. Further, clearance protrusions 12 having a larger diameter are punched out on the top surface of the core sheet 11 by punching in clearance recesses 12a having a smaller diameter on the bottom surface. The clearance protrusions 12 and the clearance recesses 12a are arranged for creating a clearance between successive core sheets 11. In this way, when the punched-off core sheets 11 are laminated by pressing, the protrusions 9 on the top surface of each of core sheet are fitted into the recesses 9a on the bottom surface of the contiguous core sheet, thereby forming positioned and regularly arranged integral lamination. At the same time, a very small clearance "g" is provided between the respective two contiguous core sheets 11 by the respective clearance protrusions 12. Further, the laminated armature core 10 is press-fitted to the rotating shaft, and is provided with armature coils. Thereafter, an insulating varnish is filled in the very small clearances "g" among the core sheets 11 by the impregnation treatment of the insulating varnish.

Figure 2:
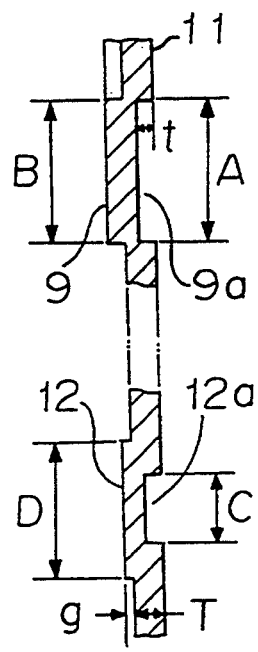
FIG. 2 is a magnified sectional diagram of a protrusion for fitting, a recess for fitting and a protrusion for clearance of a core sheet in FIG. 1B.

The protrusion 9, the recess 9a and the clearance protrusion 12 of the core sheet 11 are shown in FIG. 2 as a magnified sectional diagram. The inner diameter "A" of the recess 9a and the outer diameter "B" of the protrusion 9 share almost the same dimension, which are fitted to each other by press-fitting the core sheets 11. The outer diameter "D" of the clearance protrusion 12 is larger than the inner diameter "C" of the clearance recess 12a. The very small punched-out height "g" is the clearance between two of the contiguous core sheets 11. For instance, the sheet thickness "T" of the core sheet 11 is 0.5 mm or 0.8 mm, the punched-out height "g" is 0.05 nm or 0.1 mm and the punched-out height "t" of the recess for fitting 9 is 0.3 mm or 0.5 mm.

EXAMPLE 2

Figure 3A:
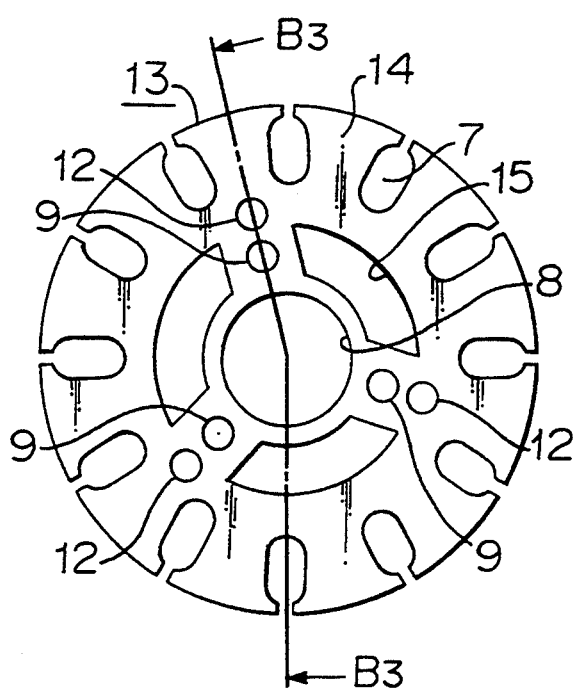
FIG. 3A is a front diagram of embodiment 2 of an armature core according to the present invention, and FIG. 3B, a sectional diagram taken along a line $B_3$—$B_3$ of FIG. 3A.
Figure 3B:
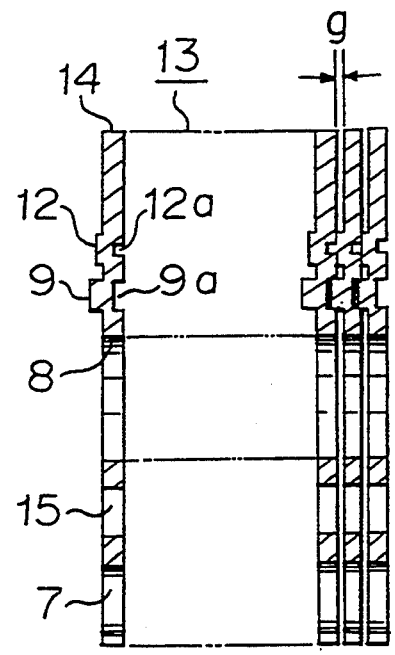

FIGS. 3A and 3B are respectively a front diagram and a sectional diagram of embodiment 2 of an armature core of this invention. A punched-off core sheet 14 of an armature core 13 is provided with the slots 7, the opening for shaft 8 and punched-off openings 15 for reducing weight. Further, the core sheet 14 is formed with the punched-out protrusions 9, the punched-in recesses 9a, the clearance protrusions 12 and the clearance recesses 12a. The punched-off core sheets 14 are integrally laminated by press-fitting the protrusions 9 on the top surface of the core sheet 14 into the recesses for 9a on the bottom surface of the contiguous core sheet 14. Further, very small clearances "g" are provided among the respective core sheet 14 by the clearance protrusions 12.

EXAMPLE 3

Figure 4A:
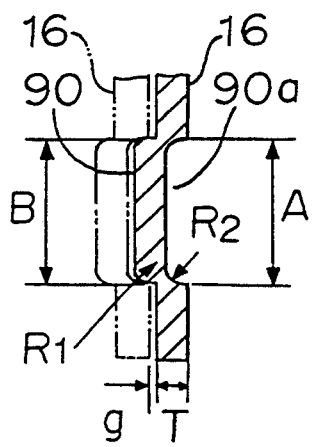
FIG. 4A is a sectional diagram showing embodiment 3 of a protrusion for fitting and a recess for fitting of a core sheet according to the present invention, and FIG. 4B, a sectional diagram showing embodiment 4 of a protrusion for fitting and a recess for fitting of a core sheet according to the present invention.

In the above respective Examples, the core sheets 11 and 14 are provided with the protrusions 9, the recesses 9a and the clearance protrusions 12. In this Example, the protrusions and the recesses are employed for the positioned and regularly arranged integral lamination as well as for providing the clearances among the core sheets, and the clearance protrusions 12 are dispensed with. In the embodiment 3 shown in FIG. 4A, a protrusion 90 which is punched out on the top surface of a core sheet 16 and a recess 90a which is punched in on the bottom surface thereof. The outer diameter "B" of the protrusion 90 and the inner diameter "A" of the recess 90a share almost the same dimension, thereby press-fitting the protrusion and the recess. The corner radius "$R_1$" of the protruded corner portion of the protrusion 90 is smaller than the corner radius "$R_2$" of the bottom surface corner portion of the recess 90a. Accordingly, when the core sheets 16 are laminated, the protrusion 90 of the core sheet 16 on the top surface partially fits in the recess 90a of the core sheet 16 on the bottom surface which is shown by a chain line thereby positioning and laminating the core sheets. Further, the corner portion of the protrusion 90 of the core sheet 16 on the bottom surface having the radius $R_1$ does not completely fit to the bottom corner portion of the recess 90a of the contiguous core sheet 16 on the top surface having the corner radius of $R_2$, thereby providing a very small clearance "g" between the two contiguous core sheets 16.

EXAMPLE 4

Figure 4B:
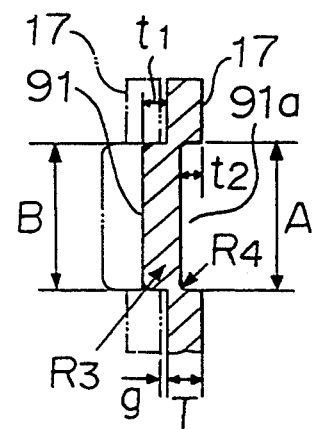
Figure 5:
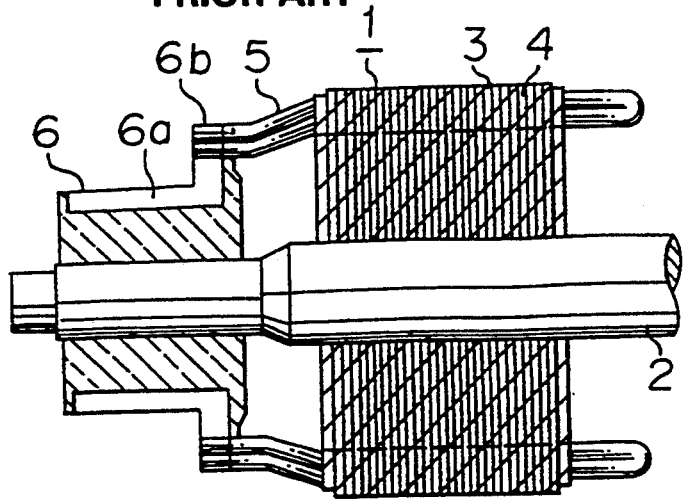
FIG. 5 is a sectional diagram of an armature of a direct current machine provided with a conventional armature core.
Figure 6A:
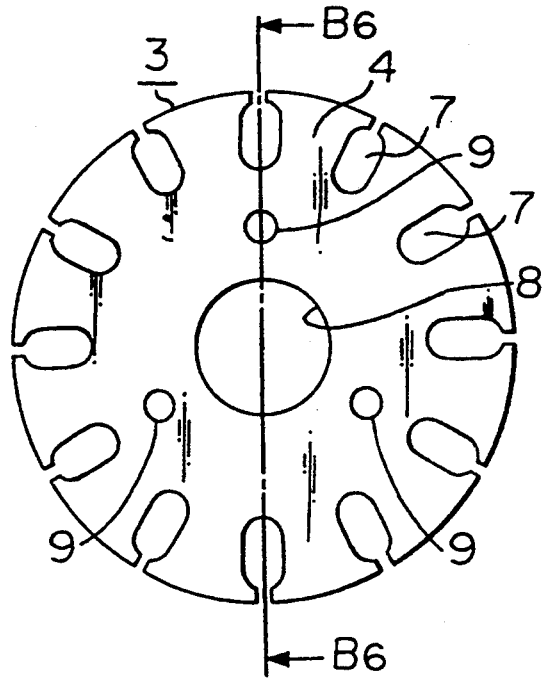
FIG. 6A is a front diagram of a conventional armature core, and FIG. 6B, a sectional diagram taken along a line $B_6$—$B_6$ of FIG. 6A.
Figure 6B:
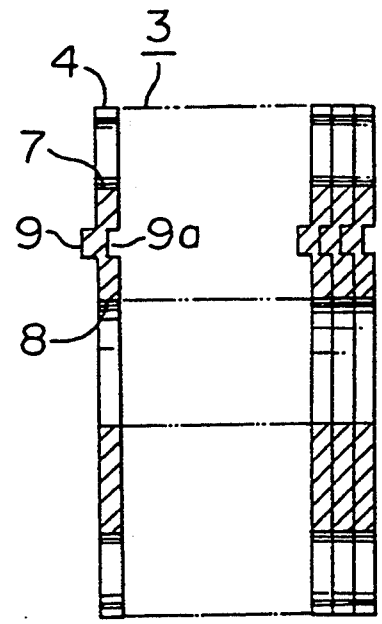

FIG. 4B is a sectional diagram showing embodiment 4 of this invention of a protrusion of a core sheet of an armature core. A core sheet 17 is formed with a punched-out protrusion 91 on its top surface and a punched-in recess 91a on its bottom surface. The outer diameter "B" of the protrusion 91 and the inner diameter "A" of the recess 91a share almost the same dimension, to thereby press-fit the protrusion and the recess. Further, the corner radius $R_3$ of the protruded corner portion of the protrusion 91 is larger than the corner radius $R_4$ of the bottom corner portion of the recess 91a. The punched-out height "$t_1$" of the protrusion 91 is slightly larger than the recess dimension "$t_2$" of the recess 91a. Accordingly, when the core sheets 17 are laminated, the protrusion 91 of the core sheet 17 on the bottom surface press-fits to the recess 91a of the contiguous core sheet 17 on the top surface which is shown by a chain line, thereby positioning and laminating the core sheets. At the same time, the very small clearance "g" is provided between the two contiguous core sheet 17 according to $t_1 - t_2 = g$.

As stated above, according to the first aspect of the present invention, a plurality of punched-in recesses are provided on the bottom surface of a core sheet and a plurality of punched-out protrusions are provided on a top surface of a core sheet which are formed by the plurality of recesses. The protrusion and the recess share almost the same diameter. A plurality of punched-in recesses having a smaller diameter are provided on its bottom surface whereas a plurality of protrusions having a larger diameter and a very small height which are punched out by the plurality of recesses, are provided on its top surface. Therefore, when the respective punched-off core sheets are pressed and laminated, the core sheets are positioned and integrally laminated, and very small clearances are provided among the respective core sheets, which reduces the iron loss and increases the output.

Further, according to the second aspect of the present invention, a plurality of punched-in recesses for fitting are provided on the bottom surface of a core sheet and a plurality of punched-out protrusions for fitting are provided on its top surface which are formed by the plurality of recesses. The protrusion and the recess share almost the same diameter. When the core sheets are laminated, the protrusions on the top surface press-fit to the recesses on the bottom surface. However, the protrusions do not completely fit to the recesses in the height direction, which provides very small clearances among the core sheets. Therefore, the invention can be achieved only by forming the protrusions for fitting and the recesses for fitting. When the respective core sheets are pressed and laminated, the core sheets are positioned and integrally laminated. Further, very small clearances are provided among the respective core sheets, which reduces the iron loss and increases the output.

What is claimed is:

1. An armature comprising:

a plurality of core sheets each having a plurality of slots, a plurality of punched-in recesses formed on a bottom surface of each core sheet and a plurality of punched-out protrusions formed on a top surface of each core sheet by punching in said plurality of punch-in recesses, both said protrusions and said recesses being formed by press-working;

said plurality of core sheets being laminated by press-fitting said plurality of core sheets together by respectively inserting said plurality of punched-out protrusions arrange don said top surface of each core sheet into said plurality of punched-out recesses on said bottom surface of a contiguous core sheet thereby positioning and integrally laminating said plurality of core sheets; and wherein a plurality of clearance protrusions, each having a very small height, are formed on said top surface of each core sheet and a plurality of clearance recesses formed on said bottom surface of each core sheet, each of said clearance recesses having a width smaller than a width of said plurality of clearance protrusions, said clearance protrusions and said clearance recesses being arranged to provide a very small clearance between two contiguous core sheets.

2. An armature comprising:

a plurality of core sheets each having a plurality of slots, a plurality of punched-in recesses formed on a bottom surface of each core sheet and a plurality of punched-out protrusions formed on a top surface of each core sheet by punching in said plurality of punched-in recesses, both said protrusions and said recesses being formed by press-working;

said plurality of core sheets being laminated by press-fitting said plurality core sheets together by respectively inserting aid plurality of punched-in protrusions arranged on said top surface of each core sheet into said plurality of punched-in recesses arranged on said bottom surface of a contiguous core sheet thereby positioning and integrally laminating said plurality of core sheets; and wherein said plurality of punched-out protrusions and said plurality of punched-in recesses of each core sheet are formed such that said plurality of punched-out protrusions substantially fit into said plurality of punched-in recesses so that in press-fitting said plurality of punched-out protrusions of a first core sheet into said plurality of punched-in recesses of a second core sheet contiguous to said first core sheet a very small clearance is provided between contiguous core sheets.

3. An armature comprising:

a plurality of core sheets each having a plurality of slots, a plurality of punched-in recesses formed on a bottom surface of each core sheet and a plurality of punched-out protrusions formed on a top surface of each core sheet by punching in said plurality of punched-in recesses, both said protrusions and said recesses being formed by press-working;

said plurality of core sheets being laminated by press-fitting said plurality of core sheets together by respectively inserting said plurality of punched-out protrusions on said top surface of each core sheet into said plurality of punched-in recesses arranged on said bottom surface of a contiguous core sheet thereby positioning and integrally laminating said plurality of core sheets; and wherein a height of each of said protrusions is larger than a depth of each of said recesses thereby providing a very small clearance between two contiguous core sheets.

* * * * *